(12) United States Patent
Klatt

(10) Patent No.: US 9,100,833 B2
(45) Date of Patent: Aug. 4, 2015

(54) BASE STATION APPARATUS FOR OPERATION AS PART OF AN ACCESS NETWORK OF A TELECOMMUNICATIONS NETWORK

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 138 days.

(21) Appl. No.: 13/886,275

(22) Filed: May 3, 2013

(65) Prior Publication Data
US 2013/0295880 A1 Nov. 7, 2013

(30) Foreign Application Priority Data
May 4, 2012 (DE) .......................... 10 2012 008 737

(51) Int. Cl.
*H04M 1/66* (2006.01)
*H04W 12/10* (2009.01)
*H04M 3/20* (2006.01)
*H04W 12/12* (2009.01)
*H04W 84/04* (2009.01)

(52) U.S. Cl.
CPC .............. *H04W 12/10* (2013.01); *H04M 3/205* (2013.01); *H04W 12/12* (2013.01); *H04W 84/045* (2013.01)

(58) Field of Classification Search
CPC ........................... H04W 84/045; H04W 88/08
USPC ........... 455/456.1, 435.1, 507, 410, 425, 436, 455/442, 422.1, 509, 418; 370/280, 328, 370/237
See application file for complete search history.

(56) References Cited

U.S. PATENT DOCUMENTS

| | | | |
|---|---|---|---|
| 2003/0063712 A1* | 4/2003 | Chattell et al. | 379/26.01 |
| 2009/0017869 A1 | 1/2009 | Hermansson et al. | |
| 2010/0014507 A1 | 1/2010 | Linkola et al. | |
| 2011/0244905 A1* | 10/2011 | Burstrom et al. | 455/507 |

\* cited by examiner

*Primary Examiner* — Kiet Doan
(74) *Attorney, Agent, or Firm* — Leydig, Voit & Mayer, Ltd.

(57) ABSTRACT

A base station apparatus for operation as part of an access network of a mobile telecommunications network includes; a housing; a radio interface unit and a core network interface unit in the housing; a network line section between the radio interface unit and the core network interface unit; and a measuring apparatus, operatively connected to the network line section. The measuring apparatus is configured to detect at least one line parameter of the network line section, the at least one line parameter including a line parameter from the group of line parameters consisting of: the input impedance of the network line section; the insulation value of the network line section; the capacitance of the network line section; and the inductance of the network line section.

13 Claims, 2 Drawing Sheets

BASE STATION APPARATUS FOR OPERATION AS PART OF AN ACCESS NETWORK OF A TELECOMMUNICATIONS NETWORK

CROSS-REFERENCE TO RELATED APPLICATIONS

This application claims priority to German Patent Application No. DE 10 2012 008 737.3, filed May 4, 2012.

FIELD

The invention relates to a base station apparatus for operation as part of an access network of a telecommunications network, in particular a mobile communications network, the base station apparatus having a housing and having a radio interface unit and a core network interface unit in the housing, and the base station apparatus having a network line section between the radio interface unit, on the one hand, and the core network interface unit, on the other hand.

The invention also relates to a method for operating a base station apparatus as part of an access network of a telecommunications network, in particular a mobile communications network, the base station apparatus having a housing and having a radio interface unit and a core network interface unit in the housing.

BACKGROUND

Various conventional methods for ensuring the security of user data in cellular mobile radio networks exist. For example, the various mobile radio standards provide a number of functionalities for encrypting, and ensuring the integrity of, both user data and signaling data.

In current mobile radio systems such as UMTS (Universal Mobile Telecommunications System) and LTE (Long Term Evolution), there are a number of different encryption approaches which are typically used in all mobile radio networks. These include, inter alia, the mutual authentication of the terminal, that is to say the telecommunications terminal, with respect to the mobile radio network and of the mobile radio network with respect to the telecommunications terminal. These methods are also referred to using the keyword authentication. Encryption of the radio data transmission is provided between the telecommunications terminal (also referred to as the terminal below) and the radio network controller RNC for the case of a UMTS network and between the telecommunications terminal and the LTE base station (eNodeB). This encryption of the radio data transmission is also referred to using the keyword ciphering. Integrity of the radio data transmission is ensured between the telecommunications terminal and the radio network controller (RNC) and between the telecommunications terminal and the LTE base station (eNB). This is also referred to using the keyword integrity protection.

In conventional mobile radio systems such as the GSM system (Global System for Mobile Telecommunications) and UMTS, the radio protection (that is to say the encryption or guarantee of integrity) typically terminates in those network elements which are set up at a location which is not accessible to third parties, namely the base station system (BSS, Base Station Subsystem) or the radio network controller (RNC), in particular. This termination of the protection at locations which are not accessible to third parties is not the case according to the LTE standard because there the radio protection (that is to say the implementation of encryption and a guarantee of integrity) ends in the LTE base station, that is to say in the eNodeB, which need not necessarily be at a location which is inaccessible to third parties.

On account of a trend for making mobile radio network elements smaller and smaller, in particular using so-called femtocells or picocells, there is a tendency to install network elements at end customers. This does not ensure that third parties do not have physical access to such network elements, with the result that the risk of attacks on the data transmission is increased.

SUMMARY

In an embodiment, the present invention provides a base station apparatus for operation as part of an access network of a mobile telecommunications network. The base station apparatus includes: a housing; a radio interface unit and a core network interface unit in the housing; a network line section between the radio interface unit and the core network interface unit; and a measuring apparatus, operatively connected to the network line section. The measuring apparatus is configured to detect at least one line parameter of the network line section, the at least one line parameter including at least one of: the input impedance of the network line section; the insulation value of the network line section; the capacitance of the network line section; or the inductance of the network line section.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
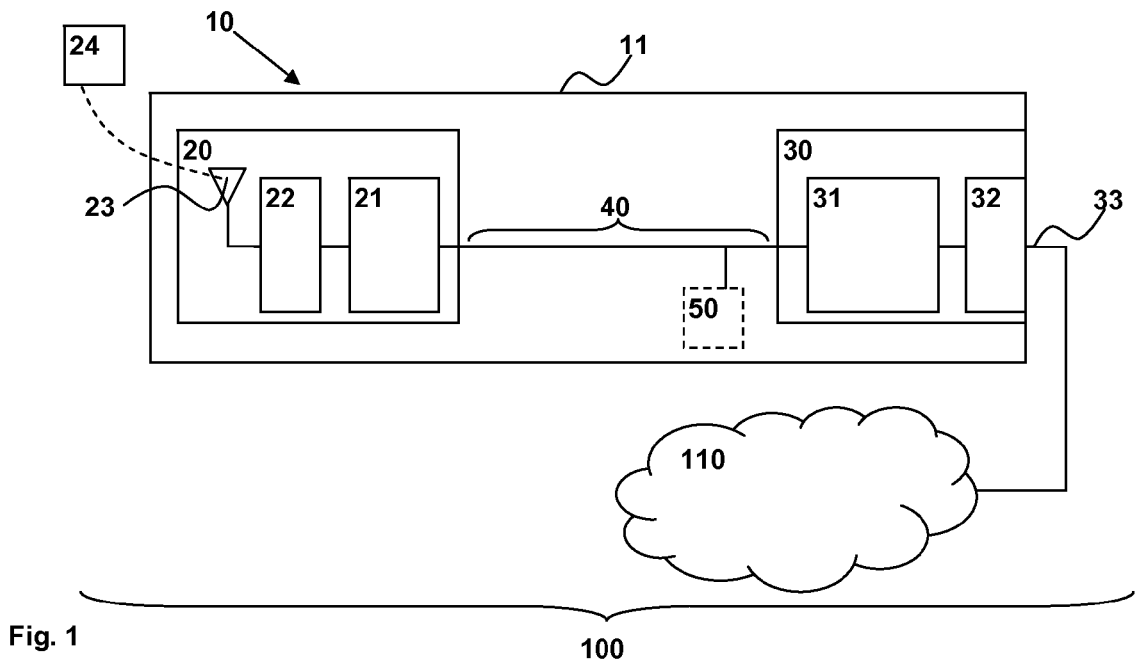
FIG. 1 schematically shows an illustration of a base station apparatus according to the present invention.

Embodiments of the present invention provide a base station apparatus for operation as part of an access network of a telecommunications network, in particular a mobile communications network, and a method for operating a base station apparatus which do not have the disadvantages of the prior art and, in particular, increase the security of data communication between, on the one hand, a telecommunications terminal, in particular a mobile telecommunications terminal, connected to the base station apparatus via a radio link and, on the other hand, a core network of the telecommunications network.

In an embodiment, a base station apparatus is provided for operation as part of an access network of a telecommunications network, in particular a mobile communications network, the base station apparatus having a housing and having a radio interface unit and a core network interface unit in the housing, the base station apparatus having a network line section between the radio interface unit, on the one hand, and the core network interface unit, on the other hand, the base station apparatus having a measuring apparatus, the measuring apparatus being operatively connected to the network line section in such a manner that the measuring apparatus detects at least one line parameter of the network line section, the line parameter being a line parameter from the group of line parameters comprising:

the input impedance of the network line section,
the insulation value of the network line section,
the capacitance of the network line section, and
the inductance of the network line section.

This advantageously makes it possible to improve the security when operating a base station apparatus even for the case in which fully adequate mobile radio access systems—consisting of a UMTS base station (NodeB) and a radio network controller (RNC) or consisting of an LTE base station—for instance in the form of femtocells or in the form of picocells, are installed at end customers of the mobile radio network operator. On account of, in particular, the cost pressure, in particular with regard to protective mechanisms such as housings and the like, such products are often typically in the form of consumer products and not in the form of professional products in the sense of professional network elements, as was previously conventional in mobile radio system components. In such systems, this results in completely new attack scenarios for the transmission path between the telecommunications terminal, on the one hand, and the core network of the telecommunications network, in particular the mobile communications network, on the other hand. Since such base station apparatuses set up in the region of end customers are set up in an environment outside the control of the mobile radio operator, attackers may at least potentially very easily gain physical access to such base station apparatuses. In addition, housings in the form of plastic housings which are easy to open and therefore difficult to protect are often used for such base station apparatuses.

Embodiments of the invention are described below using the example of a base station apparatus, in particular for femtocells or picocells for UMTS networks or LTE networks, but it will be appreciated that the base station apparatus and the method are not restricted to such mobile radio networks but may also be used, for example, in WLAN networks or in parts of a mobile radio network which are based on the WLAN standard or else being used for other radio technologies.

In an embodiment, a network line section which is present between a radio interface unit and a core network interface unit is monitored in a base station apparatus. Such a network line section is typically present in base station apparatuses in the form of femtocells or in the form of picocells because the radio interface unit, on the one hand, and the core network interface unit, on the other hand, are typically implemented on different integrated circuits inside the base station apparatus, data communication—in particular data communication based on the Internet Protocol—taking place in plain text on the network line section between the two integrated circuits or between the radio interface unit, on the one hand, and the core network interface unit, on the other hand, and thus being able to be intercepted with relatively little outlay on hardware tools or software tools.

The present invention provides for at least one line parameter of the network line section to be monitored during operation of the base station apparatus and, in the event of a change in the physical properties, that is to say in the event of a sufficiently large change in the at least one line parameter of the network line section, for this change to be detected and for a corresponding action to be triggered. In this case, the line parameters of the input impedance and/or insulation value and/or capacitance and/or inductance of the network line section are monitored, in particular, according to the invention.

In the event of an attack on the network line section with the aim of intercepting a signal on the network line section, for example, or else of manipulating a signal on the network line section, it is necessary to tap the network line section, either by means of a physical electrical tap (that is to say electrically connecting the tap line to the data lines of the network line section) or else a capacitive tap (that is to say capacitively connecting the tap line to the data lines of the network line section) or else an inductive tap (that is to say inductively connecting the tap line to the data lines of the network line section). However, every tap of this type changes the physical properties of the data line of the network line section, that is to say changes a line parameter of the network line section in the form of either the input impedance or the insulation value (also referred to as the leak impedance), the capacitance or the inductance of the network line section or a plurality of these line parameters. During normal operation of the network line section, these line parameters, that is to say the physical properties of the data lines of the network line section, are stable or are substantially stable within certain tolerance limits, with the result that the practice of monitoring these line parameters for sudden changes in one or more of the line parameters is used, according to the invention, to detect an attack on the network line section, that is to say a tap of the data line of the network line section. This is carried out, according to the invention, using a measuring apparatus present in the base station apparatus.

For example, the measuring apparatus may be a resonant circuit with evaluation of the oscillation frequency of the resonant circuit, with the result that a change in one or more of the line parameters of the network line section results in a changed resonant frequency of the resonant circuit and a change in one or more of such line parameters can thus be detected. According to the invention, all technologies for evaluating capacitive or inductive changes or impedance changes can be used to implement the measuring apparatus.

It is preferred for the measuring apparatus to be part of the radio interface unit or for the measuring apparatus to be part of the core network interface unit.

Embodiments of the invention make it possible, in a particularly advantageous manner, to also provide the measuring apparatus in a protected form, namely as part of the radio interface unit or the core network interface unit. Alternatively, however, it may also be possible, according to embodiments of the invention, for the measuring apparatus to be part of the base station apparatus in the form of a separate unit, that is to say independently of the radio interface unit or the core network interface unit. It is furthermore also possible for one measuring apparatus to be part of the radio interface unit and for a further measuring apparatus to be part of the core network interface unit or vice versa, with the result that the line parameter of the network line section is monitored both by a part of the radio interface unit and by a part of the core network interface unit and the monitoring and protection against an attack on the network line section are therefore improved.

It is preferred for the base station apparatus to be configured in such a manner that, if the measuring apparatus detects a change in the at least one line parameter above a predefined threshold value, an indicator signal is generated and the indicator signal is transmitted to the radio interface unit and/or the core network interface unit.

This makes it possible to easily detect the case of an attack on the network line section and to initiate corresponding measures. According to the invention, the measuring apparatus can detect a change in the at least one line parameter which is greater than a predefined threshold value, for example, by virtue of the threshold value predefining the magnitude of a change and by virtue of all changes in line parameters, the magnitude of which is identified as being above the predefined threshold value, resulting in the generation of the indicator signal. Furthermore, provision may also be made, according to the invention, for the threshold value to be stated as a relative change in a predefined interval of time, for example a relative change of more than a 10% deviation of the line parameter within 60 seconds or the like. This makes it possible to avoid a relatively slow drift of the line parameters resulting in the (undesired) generation of the indicator signal. In this case, it goes without saying that different predefined threshold values may be predefined for different line parameters, that is to say the predefined threshold values are different depending on whether the line parameter is the input impedance, the insulation value, the capacitance or the inductance of the network line section.

It is also preferred for the base station apparatus to be configured in such a manner that, if the indicator signal is generated,
- an optical and/or acoustic indication is given on the housing of the base station apparatus, and/or
- a network element of the core network of the telecommunications network is alerted, and/or
- a telecommunications terminal connected to the base station apparatus via the radio interface unit is alerted, and/or
- the radio interface unit is at least partially switched off This advantageously makes it possible for a flexible response to be given if an attack on the base station apparatus is detected. It is also preferred for different responses to be given depending on whether changes in the monitored line parameter exceed different predefined threshold values. This means that an indicator signal is generated, for example, if a relative change in the line parameter of, for example, more than 3% per 60 seconds (threshold value or first threshold value) is detected and this results in an optical and/or acoustic indication on the housing of the base station apparatus, while a change in the monitored line parameter of, for example, more than 6% per 60 seconds (further threshold value or second threshold value) results in a further indicator signal, with the result that, on the basis of the further indicator signal, not only an optical and/or acoustic indication is given on the housing of the base station apparatus but, additionally or alternatively, a network element of the core network is alerted or a telecommunications terminal connected to the base station apparatus is alerted or the radio interface unit is switched off.

Embodiments of the present invention furthermore also relate to a method for operating a base station apparatus as part of an access network of a telecommunications network, in particular a mobile communications network, the base station apparatus having a housing and having a radio interface unit and a core network interface unit in the housing, the base station apparatus having a network line section between the radio interface unit, on the one hand, and the core network interface unit, on the other hand, at least one line parameter of the network line section being detected during operation of the base station apparatus, the line parameter being a line parameter from the group of line parameters comprising:
- the input impedance of the network line section,
- the insulation value of the network line section,
- the capacitance of the network line section, and
- the inductance of the network line section.

This makes it possible, in a particularly advantageous manner, to make the operation of a base station apparatus more secure and to better protect data communication using, in particular, small base stations in the form of picocells or femtocells.

In the method according to an embodiment of the invention for operating the base station apparatus, it is preferred, in particular, for the at least one line parameter to be detected by the radio interface unit or for the at least one line parameter to be detected by the core network interface unit.

It is also preferred for an indicator signal to be generated if a change in the at least one line parameter above a predefined threshold value is detected, the indicator signal being transmitted to the radio interface unit and/or the core network interface unit.

It is also preferred, if the indicator signal is generated,
- for an optical and/or acoustic indication to be given on the housing of the base station apparatus, and/or
- for a network element of the core network of the telecommunications network to be alerted, and/or
- for a telecommunications terminal connected to the base station apparatus via the radio interface unit to be alerted, and/or
- for the radio interface unit to be at least partially switched off Embodiments of the present invention furthermore also relate to a computer program having program code means which can be used to carry out all of the steps of the method according to the invention if the computer program is executed on a programmable device.

Embodiments of the present invention also relate to a computer program product having a computer-readable medium and a computer program which is stored on the computer-readable medium and has program code means which are suitable for carrying out all of the steps of the method according to the invention if the computer program is executed on a programmable device.

Further details, features and advantages of the invention emerge from the drawings and from the following description of preferred embodiments using the drawings. In this case, the drawings illustrate only exemplary embodiments of the invention which do not restrict the fundamental concept of the invention.

In the different figures, the same parts are always provided with the same reference symbols and are therefore also generally named or mentioned only once in each case.

FIG. 1 illustrates an exemplary embodiment of a base station apparatus according to the present invention. The base station apparatus 10 has a housing 11. The base station apparatus 10 also has a radio interface unit 20, a core network interface unit 30 and a network line section 40. The network line section 40 is provided between the radio interface unit 20 and the core network interface unit 30 and transmits signals between these two units. According to the invention, the base station apparatus 10 also has a measuring apparatus 50, the measuring apparatus 50 being able to be provided, according to variants of the present invention, either in the radio interface unit 20 or in the core network interface unit 30 or else one measuring apparatus 50 being able to be provided in the radio interface unit 20 and a further measuring apparatus (not illustrated) being able to be provided in the core network interface unit 30 (or vice versa). Furthermore, the measuring apparatus 50 may also be implemented independently of the radio interface unit 20 or the core network interface unit 30 (which is indicated in FIG. 1 using a dashed line of the measuring apparatus 50). The measuring apparatus 50 is operatively connected to the network line section 40 in such a manner that the measuring apparatus 50 detects at least one line parameter of the network line section 40. The line parameter is a line parameter from the group of line parameters comprising the input impedance of the network line section 40, the insulation value of the network line section 40, the capacitance of the network line section 40 and the inductance of the network line section 40.

The radio interface unit 20 has, in particular, a baseband processor 21, a radio signal frontend 22 and an antenna 23. The core network interface unit 30 has, in particular, a DSL modem 31 and a network connection 32, the core network interface unit 30 being connected to the core network 110 of a telecommunications network 100 using a network line 33, the base station apparatus 10 being part of the access network of the telecommunications network 100.

For the case of a UMTS mobile radio network for example, the radio interface unit 20 implements the functions of a UMTS base station (NodeB) and the radio network controller (RNC). As a result, the encrypted connection to a telecommunications terminal 24 connected to the base station apparatus 10 is terminated in the radio interface unit 20. For the case of an LTE mobile radio network, the radio interface unit 20 accordingly has the functionality of an LTE base station (eNodeB), with the result that the encrypted communication with the telecommunications terminal 24 is likewise terminated in the radio interface unit 20. For the connection to the core network 110 of the telecommunications network 100, a DSL connection or another broadband connection of the base station apparatus 10 is typically provided via the core network interface unit 30 and the network line 33, a secure connection using the IPsec protocol being provided in this case, in particular. This IPsec connection, in terms of the communication with the core network 110, is also terminated in the core network interface unit 30, with the result that the network line section 40 between the radio interface unit 20 and the core network interface unit 30 is typically insecure and is monitored according to the invention. According to the invention, this ensures that, in the event of a change in the physical properties of the network line section 40, the monitoring results in this change being detected and in a corresponding action being triggered if these physical properties change.

Figure 2:
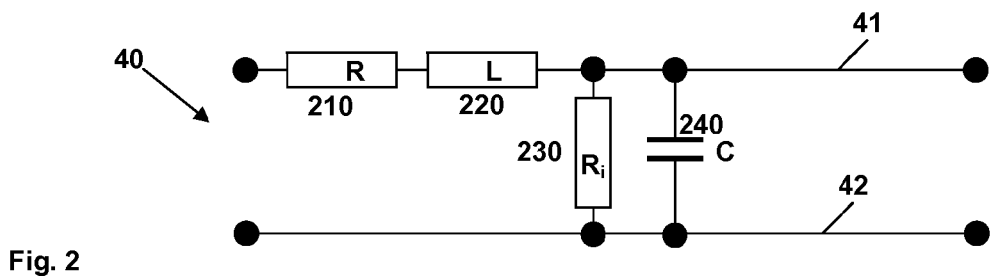
FIG. 2 schematically shows an equivalent circuit diagram of a network line section.

FIG. 2 schematically illustrates an equivalent circuit diagram of the network line section 40 according to the present invention. The network line section 40 has data lines 41, 42 which are used to transmit signals, typically in the form of electrical signals. The network line section 40 and the data lines 41, 42 have an input impedance 210, an inductance 220, an insulation value or a leak impedance 230 and a capacitance 240. If the data lines of the network line section 40 are tapped, at least one of these line parameters changes, which is why such a tap can be detected by the measuring apparatus 50. For example, the measuring apparatus 50 comprises a resonant circuit and a possibility for evaluating the oscillation frequency or the resonant frequency of the resonant circuit in such a manner that the resonant frequency of the resonant circuit is changed if one or more of the line parameters of the network line section 40 change. In this case, an optical and/or acoustic indication is given, in particular on the housing 11 of the base station apparatus 10, or a network element of the core network 110 is alerted or the telecommunications terminal 24 is alerted or else the radio interface unit 20 is switched off.

Figure 3:
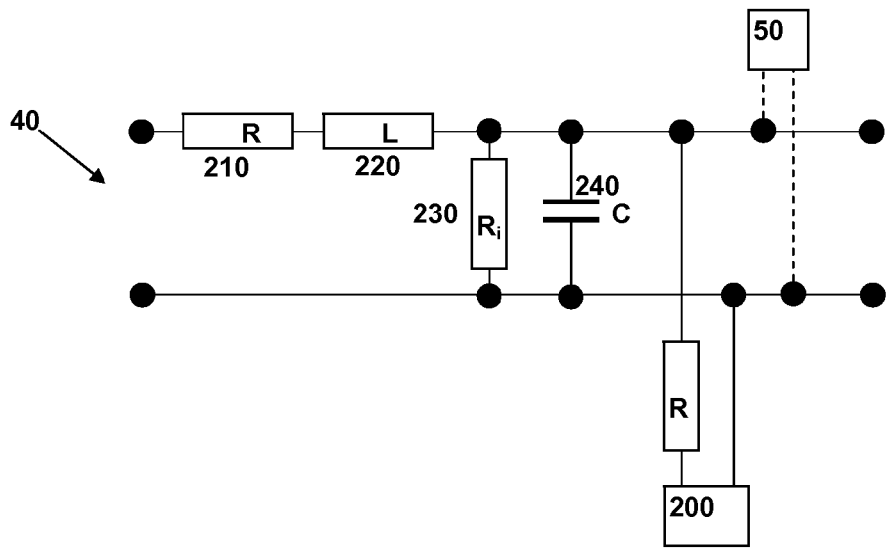
FIGS. 3 to 6 schematically show different attack scenarios.
Figure 4:
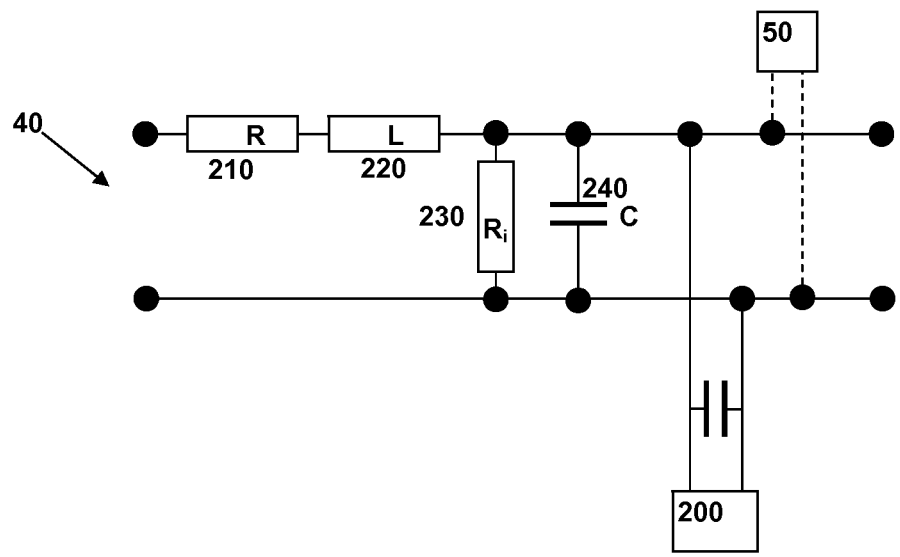
Figure 5:
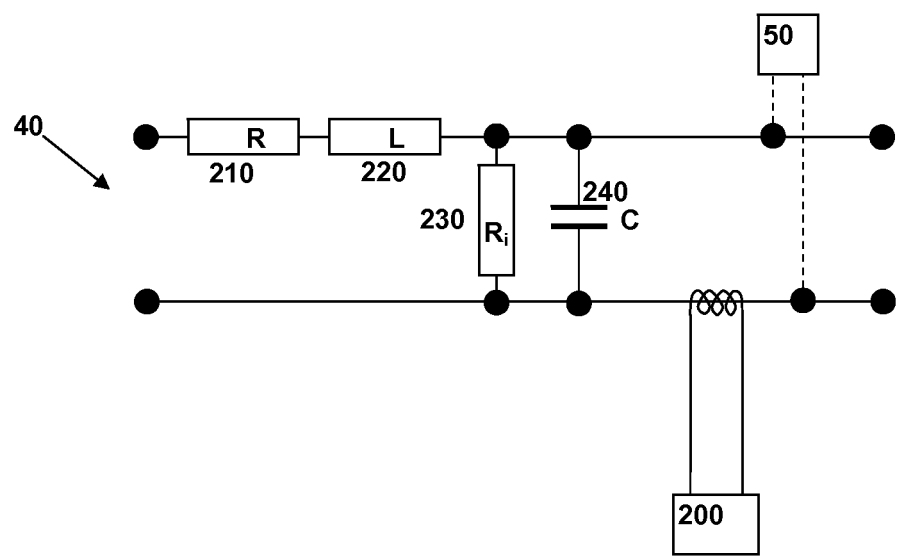
Figure 6:
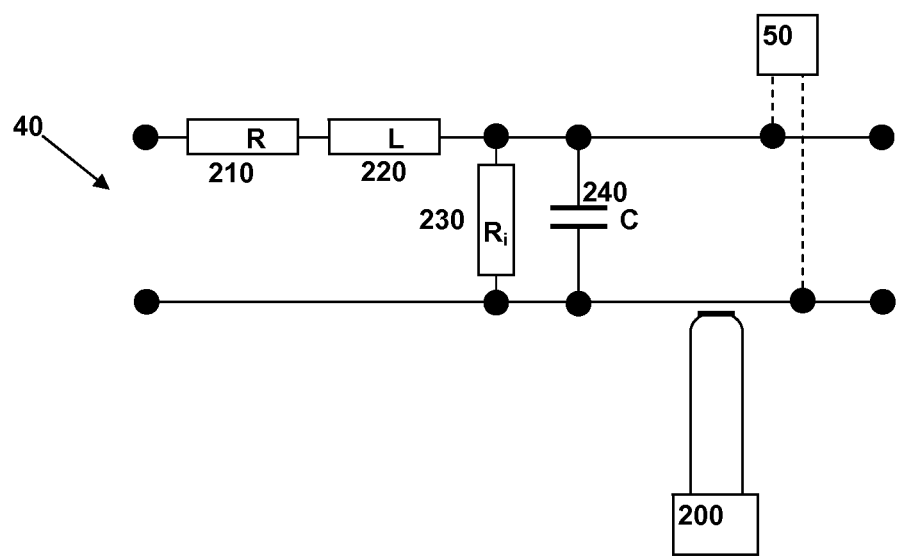

FIGS. 3 to 6 schematically show different attack scenarios, with FIG. 3 schematically showing an electrical tap 200 and the measurement of the inductance of the data lines 41, 42 by the measuring apparatus 50, with FIG. 4 schematically showing a capacitive tap 200 and the measurement of the capacitance of the data lines 41, 42 by the measuring apparatus 50, with FIG. 5 schematically showing an inductive tap 200 and the measurement of the inductance of the data lines 41, 42 by the measuring apparatus 50, and with FIG. 6 schematically showing a further capacitive tap 200 and the measurement of the capacitance of the data lines 41, 42 by the measuring apparatus 50.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A base station apparatus for operation as part of an access network of a mobile telecommunications network, the base station apparatus comprising:
 a housing;
 a radio interface unit and a core network interface unit in the housing, the radio interface unit comprising a first integrated circuit and the core network interface unit comprising a second integrated circuit, wherein the first and second integrated circuits are configured to transfer data in plain text between one another;
 a network line section between the first and second integrated circuits; and
 a measuring apparatus, operatively connected to the network line section, wherein the measuring apparatus is configured to detect at least one line parameter of the network line section, the at least one line parameter including at least one of: the input impedance of the network line section; the insulation value of the network line section; the capacitance of the network line section; or the inductance of the network line section;
 wherein the base station apparatus is configured to, in response to the measuring apparatus detecting a change in the at least one line parameter exceeding a predefined threshold value, generate an indicator signal and transmit the indicator signal to at least one of the radio interface unit or the core network interface unit, wherein the indicator signal is indicative of an attack on the network line section via an electrical, capacitive, and/or inductive tap; and
 wherein the base station apparatus is further configured to, in response to the indicator signal being generated, alert a network element of the core network of the telecommunications network; or the base station apparatus is further configured to, in response to the indicator signal being generated, alert a telecommunications terminal connected to the base station apparatus via the radio interface unit.

2. The base station apparatus according to claim 1, wherein the measuring apparatus is part of the radio interface unit.

3. The base station apparatus according to claim 1, wherein the measuring apparatus is part of the core network interface unit.

4. The base station apparatus according to claim 1, wherein the base station apparatus is configured to, in response to the indicator signal being generated, provide at least one of an optical or acoustic indication on the housing of the base station apparatus.

5. The base station apparatus according to claim 1, wherein the base station apparatus is configured to, in response to the indicator signal being generated, at least partially switch off the radio interface unit.

6. The base station apparatus according to claim 1, wherein the data transfer between the first and second integrated circuits is based on the Internet Protocol for data communication.

7. A method for operating a base station apparatus as part of an access network of a mobile telecommunications network, the base station apparatus having a housing, a radio interface unit comprising a first integrated circuit and a core network interface unit comprising a second integrated circuit in the housing, the first and second integrated circuits being configured to transfer data in plain text between one another, and a network line section between the first and second integrated circuits, the method comprising:
- detecting at least one line parameter of the network line section during operation of the base station apparatus, the at least one line parameter including at least one of: the input impedance of the network line section; the insulation value of the network line section; the capacitance of the network line section; or the inductance of the network line section;
- generating, in response to detecting a change in the at least one line parameter exceeding a predefined threshold value, an indicator signal; and
- transmitting the indicator signal to at least one of the radio interface unit or the core network interface unit;
- wherein the indicator signal is indicative of an attack on the network line section via an electrical, capacitive, and/or inductive tap: and
- wherein the method further comprises: alerting a network element of the core network of the telecommunications network; or wherein the method further comprises: alerting a telecommunications terminal connected to the base station apparatus via the radio interface unit.

8. The method according to claim 7, wherein the at least one line parameter is detected by the radio interface unit.

9. The method according to claim 7, wherein the at least one line parameter is detected by the core network interface unit.

10. The method according to claim 7, further comprising: providing at least one of an optical or acoustic indication on the housing of the base station apparatus.

11. The method according to claim 7, further comprising: at least partially switching off the radio interface unit, 12. The method according to claim 7, wherein the data transfer between the first and second integrated circuits is based on the Internet Protocol for data communication.

13. A non-transitory computer-readable medium having processor-executable instructions stored thereon for operating a base station apparatus as part of an access network of a mobile telecommunications network, the base station apparatus having a housing, a radio interface unit comprising a first integrated circuit and a core network interface unit comprising a second integrated circuit in the housing, the first and second integrated circuits being configured to transfer data in plain text between one another, and a network line section between the first and second integrated circuits, the processor-executable instructions including instructions for:
- detecting at least one line parameter of the network line section during operation of the base station apparatus, the at least one line parameter including at least one of: the input impedance of the network line section; the insulation value of the network line section; the capacitance of the network line section; or the inductance of the network line section;
- generating, in response to detecting a change in the at least one line parameter exceeding a predefined threshold value, an indicator signal; and
- transmitting the indicator signal to at least one of the radio interface unit or the core network interface unit;
- wherein the indicator signal is indicative of an attack on the network line section via an electrical, capacitive, and/or inductive tap: and
- wherein the processor-executable instructions further include instructions for: alerting a network element of the core network of the telecommunications network; or wherein the processor-executable instructions further include instructions for: alerting a telecommunications terminal connected to the base station apparatus via the radio interface unit.

* * * * *